United States Patent
Russell et al.

(10) Patent No.: US 6,591,275 B1
(45) Date of Patent: Jul. 8, 2003

(54) OBJECT-RELATIONAL MAPPING FOR TABLES WITHOUT PRIMARY KEYS

(75) Inventors: Craig L. Russell, Mountain View, CA (US); Marina V. Vatkina, Mountain View, CA (US); Michael E. Watzek, Berlin (DE)

(73) Assignee: Sun Microsystems, Inc., Santa Clara, CA (US)

( * ) Notice: Subject to any disclaimer, the term of this patent is extended or adjusted under 35 U.S.C. 154(b) by 159 days.

(21) Appl. No.: 09/585,602

(22) Filed: Jun. 2, 2000

(51) Int. Cl.[7] .............................................. G06F 17/30
(52) U.S. Cl. ............................ 707/103 R; 707/103 Y
(58) Field of Search ......................... 709/310; 707/100, 707/101, 102, 103, 1, 3, 4, 8

(56) References Cited

U.S. PATENT DOCUMENTS

| | | | |
|---|---|---|---|
| 4,589,092 A | 5/1986 | Matick | 364/900 |
| 4,930,071 A * | 5/1990 | Tou et al. | 707/101 |
| 5,043,876 A | 8/1991 | Terry | 364/200 |

(List continued on next page.)

FOREIGN PATENT DOCUMENTS

| | | | | |
|---|---|---|---|---|
| EP | 0 472 812 A1 | 2/1991 | | G06F/9/45 |
| EP | WO 99/32997 | 7/1999 | | |
| WO | WO 95/03586 | 2/1995 | | G06F/15/40 |
| WO | WO 95/04960 | 2/1995 | | G06F/17/30 |
| WO | WO 97/03406 | 1/1997 | | G06F/17/30 |

OTHER PUBLICATIONS

Elmasri et al., "Fundamentals of Database Systems," Second Edition, 1994, Addison–Wesley Publishing Company, p. 87.

K. Arnold, J. Gosling, and D. Holmes, "The Java Programming Language Third Edition," The Java™ Series, Sun Microsystems, 2000.

IBM Technical Disclosure Bulletin, vol. 37, No. 8, Aug. 1994, Automatically Revising Function Prototypes in C and C++ Implementations of System Object Model Classes.

B. Suk Lee, "Outer Joins and Filters for Instantiating Objects from Relational Databases Through Views," IEEE, vol. 6, No. 1, Feb. 1994, pp. 108–119.

(List continued on next page.)

*Primary Examiner*—Diane D. Mizrahi
*Assistant Examiner*—Yicun Wu
(74) *Attorney, Agent, or Firm*—Finnegan, Henderson, Farabow, Garrett & Dunner, LLP

(57) ABSTRACT

Methods and systems consistent with the present invention provide an improved object-relational mapping tool used to maintain information in relational database tables that do not utilize primary keys. The improved object-relational mapping tool uses a cursor update operation associated with relational database tables to maintain information contained in a relational database table without primary keys, including performing operations such as, delete or update on the table.

6 Claims, 6 Drawing Sheets

U.S. PATENT DOCUMENTS

| | | | |
|---|---|---|---|
| 5,261,069 A | 11/1993 | Wilkinson et al. | 395/425 |
| 5,263,155 A | 11/1993 | Wang | 395/600 |
| 5,280,612 A | 1/1994 | Lorie et al. | 395/600 |
| 5,291,583 A | 3/1994 | Bapat | 395/500 |
| 5,301,297 A | 4/1994 | Menon et al. | 395/425 |
| 5,504,885 A * | 4/1996 | Alashqur | 707/4 |
| 5,542,078 A | 7/1996 | Martel et al. | 395/600 |
| 5,548,749 A | 8/1996 | Kroenke et al. | 395/600 |
| 5,574,882 A | 11/1996 | Menon et al. | 395/441 |
| 5,583,983 A | 12/1996 | Schmitter | 395/705 |
| 5,596,746 A | 1/1997 | Shen et al. | 395/621 |
| 5,627,979 A | 5/1997 | Chang et al. | 395/335 |
| 5,640,555 A | 6/1997 | Kleewein et al. | 395/610 |
| 5,659,738 A | 8/1997 | Letkeman et al. | 395/613 |
| 5,701,453 A | 12/1997 | Maloney et al. | 395/602 |
| 5,732,257 A * | 3/1998 | Atkinson et al. | 707/102 |
| 5,742,813 A | 4/1998 | Kavanagh et al. | 395/608 |
| 5,765,159 A * | 6/1998 | Srinivasan | 707/100 |
| 5,774,731 A | 6/1998 | Higuchi et al. | 395/726 |
| 5,829,006 A | 10/1998 | Parvathaneny et al. | 707/101 |
| 5,832,484 A | 11/1998 | Sankaran et al. | 707/8 |
| 5,832,498 A | 11/1998 | Exertier | 707/103 |
| 5,835,906 A | 11/1998 | Hagersten et al. | 395/601 |
| 5,835,910 A | 11/1998 | Kavanagh et al. | 707/103 |
| 5,850,544 A * | 12/1998 | Parvathaneny et al. | 707/101 |
| 5,857,197 A | 1/1999 | Mullins | 707/103 |
| 5,860,070 A | 1/1999 | Tow et al. | 707/8 |
| 5,873,093 A | 2/1999 | Williamson et al. | 707/101 |
| 5,878,411 A | 3/1999 | Burroughs et al. | 707/4 |
| 5,878,419 A * | 3/1999 | Carter | 707/10 |
| 5,893,108 A * | 4/1999 | Srinivasan et al. | 707/103 R |
| 5,907,846 A * | 5/1999 | Berner et al. | 707/103 R |
| 5,920,725 A | 7/1999 | Ma et al. | 395/712 |
| 5,933,824 A | 8/1999 | DeKoning et al. | 707/8 |
| 5,937,402 A | 8/1999 | Pandit | 707/4 |
| 5,937,409 A * | 8/1999 | Wetherbee | 707/1 |
| 6,003,040 A | 12/1999 | Mital et al. | 707/103 |
| 6,009,428 A | 12/1999 | Kleewein et al. | 707/10 |
| 6,038,565 A | 3/2000 | Nock | 707/101 |
| 6,049,673 A | 4/2000 | McComb et al. | 395/712 |
| 6,163,776 A * | 12/2000 | Periwal | 707/101 |
| 6,175,837 B1 | 1/2001 | Sharma et al. | 707/103 |
| 6,182,274 B1 | 1/2001 | Lau | 717/1 |
| 6,385,618 B1 | 5/2002 | Ng et al. | 707/103 Y |

OTHER PUBLICATIONS

T. Lindholm and F. Yellin, "The Java Virtual Machine Specification" Second Edition, Apr. 1999, pp. 1–473.

H. Bank, "OQL," Sep. 15, 1997 (Rev. 0.11), pp. 1–7.

"Applications in Java and Extended Java," Sep. 28, 1998, pp. 1–21.

S. Wang, "Improvement of Concurrency Control within Object–Oriented Database Systems," 1990, IEEE, pp. 68–70.

S. Heiler and S. Zdonik, "Object Views: Extending the Vision," 1990 IEEE, pp. 86–93.

X. Qian and L. Raschid, "Query Interoperation Among Object–Oriented and Relational Databases," Mar. 6, 1995, IEEE, pp. 271–278.

S. Gantimahapatruni and G. Karabatis, "Enforcing Data Depencencies in Cooperative Information Systems," May 12, 1993, IEEE, pp. 332–341.

IBM Technical Disclosure Bulletin, vol. 38, No. 01, Jan. 1995, FAST and Secure Stored Procedures for a Client/Server DBMS, pp. 79–82.

Gosling, Joy and Steele, "The Java ™ Language Specification," Addison–Wesley (1996).

"Java™ Blend ™ Tutorial," Sun Microsystems, Java Software Division, Revision A, Jun. 1998 (1996).

"Mapping/Decoding Relationships", Website: *http://www.it-dart.com/tutorial*; Infotech University, downloaded Mar. 24, 2003.

* cited by examiner

OBJECT-RELATIONAL MAPPING FOR TABLES WITHOUT PRIMARY KEYS

RELATED APPLICATIONS

The following identified U.S. patent applications are relied upon and are incorporated by reference in this application.

Provisional U.S. Patent Application No. 60/068,415, now provisional application expired May 8, 2002 entitled "System and Method for Mapping Between Objects and Databases," filed on Dec. 22, 1997.

U.S. patent application Ser. No. 09/106,186, now U.S. Pat. No. 6,175,837 entitled "Object-Relational Mapping Tool That Processes Views," bearing, and filed on Jun. 29, 1998.

U.S. patent application Ser. No. 09/106,189, now abandoned entitled "Evolution of Object-Relational Mapping Through Source Code Merging," and filed on Jun. 29, 1998.

U.S. patent application Ser. No. 09/105,957, now U.S. Pat No. 6,385,618 entitled "Evolution of Object-Relational Class Mapping With Schema Merging," and filed on Jun. 29, 1998.

U.S patent application Ser. No. 09/106,210, now U.S. Pat. No. 6,360,223 entitled "Rule-Based Approach to Object-Relational Mapping Strategies," and filed on Jun. 29, 1998.

U.S. patent application Ser. No. 09/106,212, now U.S. Pat. No. 6,268,850 entitled "User Interface for the Specification of Lock Groups," and filed on Jun. 29, 1998.

U.S. patent application Ser. No. 09/106,119, now U.S. Pat. No. 6,240,413 entitled "A Fine-Grained Consistency Mechanism for Optimistic Concurrency Control Using Lock Groups," and filed on Jun. 29, 1998.

U.S. patent application Ser. No. 09/106,211, now abandoned entitled "User Interface for the Specification of Index Groups Over Classes," and filed on Jun. 29, 1998.

U.S. patent application Ser. No. 09/106,188, now U.S. Pat. No. 6,374,256 entitled "Method and Apparatus for Creating Indexes in a Relational Database Corresponding to Classes in an Object-Oriented Application," and filed on Jun. 29, 1998.

U.S. patent application Ser. No. 09/106,190, now U.S. Pat. No. 6,608,709 entitled "Method and Apparatus for Loading Stored Procedures in a Database Corresponding to Object-Oriented Data Dependencies," and filed on Jun. 29, 1998.

U.S. patent application Ser. No. 09/106,046, now U.S. Pat. No. 6,279,008 entitled "An Integrated Graphical User Interface Method and Apparatus for Mapping Between Objects and Databases," and filed on Jun. 29, 1998.

U.S. patent application Ser. No. 09/105,955, now abandoned entitled "Methods and Apparatus for Efficiently Splitting Query Execution Across Client and Server in an Object-Relational Mapping," and filed on Jun. 29, 1998.

FIELD OF THE INVENTION

The present invention relates generally to data processing systems and, more particularly, to an object-relational mapping tool for accessing data stored in relational database tables that do not utilize primary keys.

BACKGROUND OF THE INVENTION

Object-relational mapping tools have been created to facilitate development of application programs that utilize a relational database. A relational database stores data in tables having rows (records) and columns (fields). The tables are usually interrelated, and thus, there is a logical structure imposed on the database. This logical structure is known as a schema. Each table may have a primary key, comprising one or more columns that uniquely identify a row. For example, in a table with rows of customers, a column storing each customer's social security number may be used as the primary key because it uniquely identifies each customer in the table. However, one may have relational database tables that do not have primary keys.

Object-relational mapping tools read database schema information and automatically generate source code from the database. This source code contains a number of classes whose interrelationships reflect the logical structure, or schema, of the database. A class, such as a Java™ class, is a data structure containing both data members that store data and function members (or methods) that act upon the data. The source code may contain one class for each table in the database, and each class may have a data member for each column in the corresponding table. Additionally, the classes contain function members that are used to both get and set the values for the data members and, eventually, update the database.

By using an object-relational mapping tool, a programmer can automatically generate source code to facilitate database application development. After the source code is generated, the programmer writes code to interact with only the classes in the source code and not the database, thus hiding the complexities of interacting with the database from the programmer. This allows a programmer who is familiar with object-oriented programming to code against familiar classes and not unfamiliar, sometimes cumbersome to use, database query languages.

When a database schema is mapped to classes, most tables map directly to classes. Each row within a table maps to an instance of the class, and is identified with a unique object identifier—the primary key for tables with primary keys. The object-relational mapping tool relies on the unique object identifiers corresponding to the primary keys to maintain information in the corresponding relational database table. For example, conventional object-relational mapping tools use the unique object identifiers to update and delete information contained in the corresponding relational database table. The conventional object-relational mapping tools, however, cannot maintain information in relational database tables without primary keys. Thus, there is a need for systems and methods that permit object-relational mapping tools to maintain database tables without primary keys.

SUMMARY OF THE INVENTION

In accordance with methods and systems consistent with the present invention, an object-relational mapping tool is provided that can be used to maintain information in relational database tables that do not use primary keys. The object-relational mapping tool uses a cursor update operation associated with relational database tables to maintain information contained in the relational database table, including performing operations such as, updating rows, and deleting rows from the table.

In accordance with methods consistent with the present invention, a method is provided in a computer system having a non-primary key table. The method, upon receiving a selection instruction with a set of values, identifies all columns from the table with all of the specified values to select a set of rows from the table, and then for each selected row the method creates an object with a unique identifier and populates attributes of the object with values from all of the columns that form the selected row.

In accordance with methods consistent with the present invention, another method is provided in a computer system having a non-primary key table, where each row in the table is being represented by a corresponding object. The method, upon receiving an update instruction to update values of attributes of an object, selects rows with all of the same values as stored in the object using cursor update, and updates one of the selected row with values from the instruction.

In accordance with methods consistent with the present invention, yet another method is provided in a computer system having a non-primary key table, where each row in the table is being represented by a corresponding object. The method, upon receiving a delete instruction to delete an object, selects rows with all of the same values as stored in the object using cursor update, and deletes one of the selected rows.

In accordance with systems consistent with the present invention, a data processing system is provided comprising a secondary storage device, a memory, and a processor. The memory contains a non-primary key table with rows and columns and an object-relational mapping tool configured to, upon receiving a selection instruction with a set of values, identify all columns with all of the values specified in the set to select a set of rows from the table, and for each selected row, create an object with a unique identifier and populate attributes of the object with values from the columns that form the selected row. The processor is configured to run the object-relational mapping tool.

In accordance with systems consistent with the present invention, a data processing system is provided comprising a secondary storage device, a memory, and a processor. The memory contains a non-primary key table with rows and columns, and an object-relational mapping tool configured to, upon receiving an update instruction, select a row with all of the same values as stored in the object using cursor update, and update one of the selected row with values from the instruction. The processor is configured to run the object-relational mapping tool.

In accordance with systems consistent with the present invention, a data processing system is provided comprising a secondary storage device, a memory, and a processor. The memory contains a non-primary key table with rows and columns and an object-relational mapping tool configured to, upon receiving a delete instruction, select rows with all of the same values as stored in the object using cursor update, and delete one of the selected rows. The processor is configured to run the object-relational mapping tool.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Methods and systems consistent with the present invention provide an improved object-relational mapping tool that can be used to maintain information in relational database tables that do not use primary keys. Accordingly, a programmer may perform instructions, including updating a row in a table, deleting a row in a table, and reading information from a table where the table does not use primary keys.

Overview

In accordance with methods and systems consistent with the present invention, an improved object-relational mapping tool is provided that can be used to maintain information in relational database tables that do not use primary keys. The improved object-relational mapping tool uses a cursor update operation associated with relational database tables to maintain information contained in a relational database table without primary keys, including performing operations such as, delete, update, or read on the table.

Implementations Details

Figure 1:
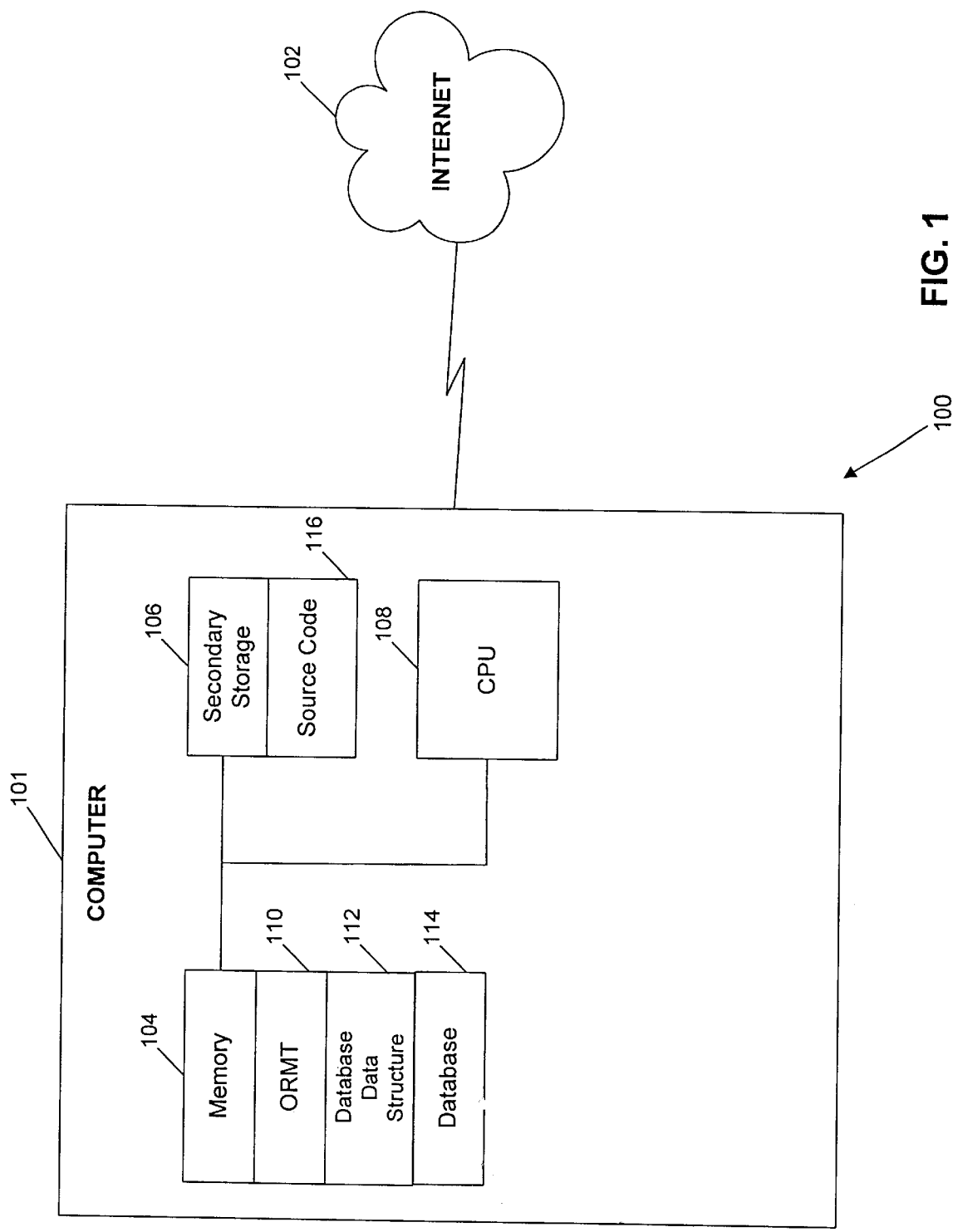
FIG. 1 depicts a data processing system suitable for practicing methods and systems consistent with the present invention.

FIG. 1 depicts a data processing system 100 suitable for practicing methods and systems consistent with the present invention. Data processing system 100 includes computer 101 connected to the Internet 102. Computer 101 includes memory 104, secondary storage device 106, and central processing unit (CPU) 108. Memory 104 includes an object-relational mapping tool 110 (ORMT) in accordance with methods and systems consistent with the present invention. In addition, the memory includes a database data structure 112 that reflects the schema of database 114, which is also included in memory 104. Secondary storage device 106 contains source code 116, which has classes reflecting the schema of database 114.

Although computer 101 is depicted with various components, one skilled in the art will appreciate that this computer can contain additional or different components. Additionally, although computer 101 is shown connected to the Internet 102, computer 101 may be connected to other networks, including other wide area networks or local area networks. Moreover, even though ORMT 110, database data structure 112, and database 114 are depicted as being stored in the memory of the same computer, these may be stored in the memory of different computers connected to each other via Internet 102, or a similar network. Furthermore, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Still further, one skilled in the art will appreciate that database source code 116 may be stored on or distributed across other devices on the Internet 102.

Figure 2:
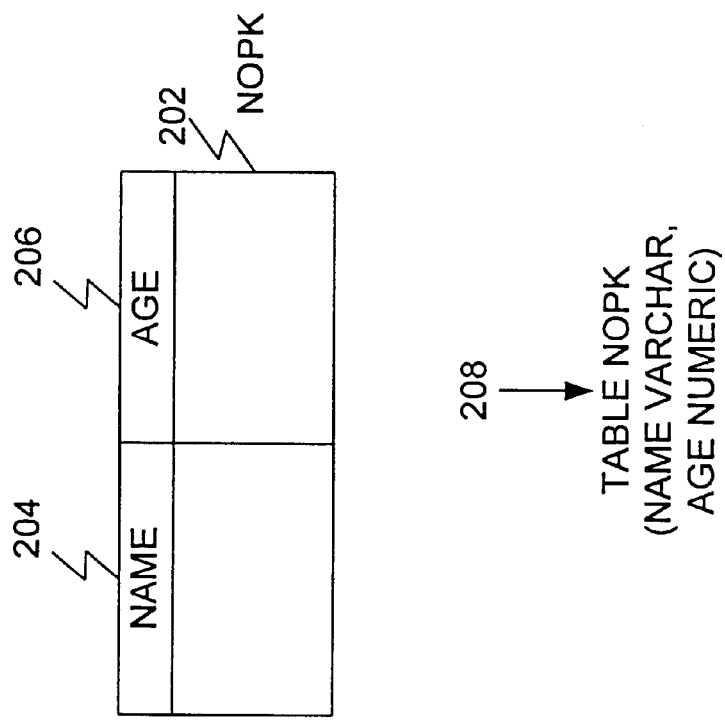
FIG. 2 depicts a relational database table and a corresponding schema for the relational database table in accordance with the present invention.
Figure 3:
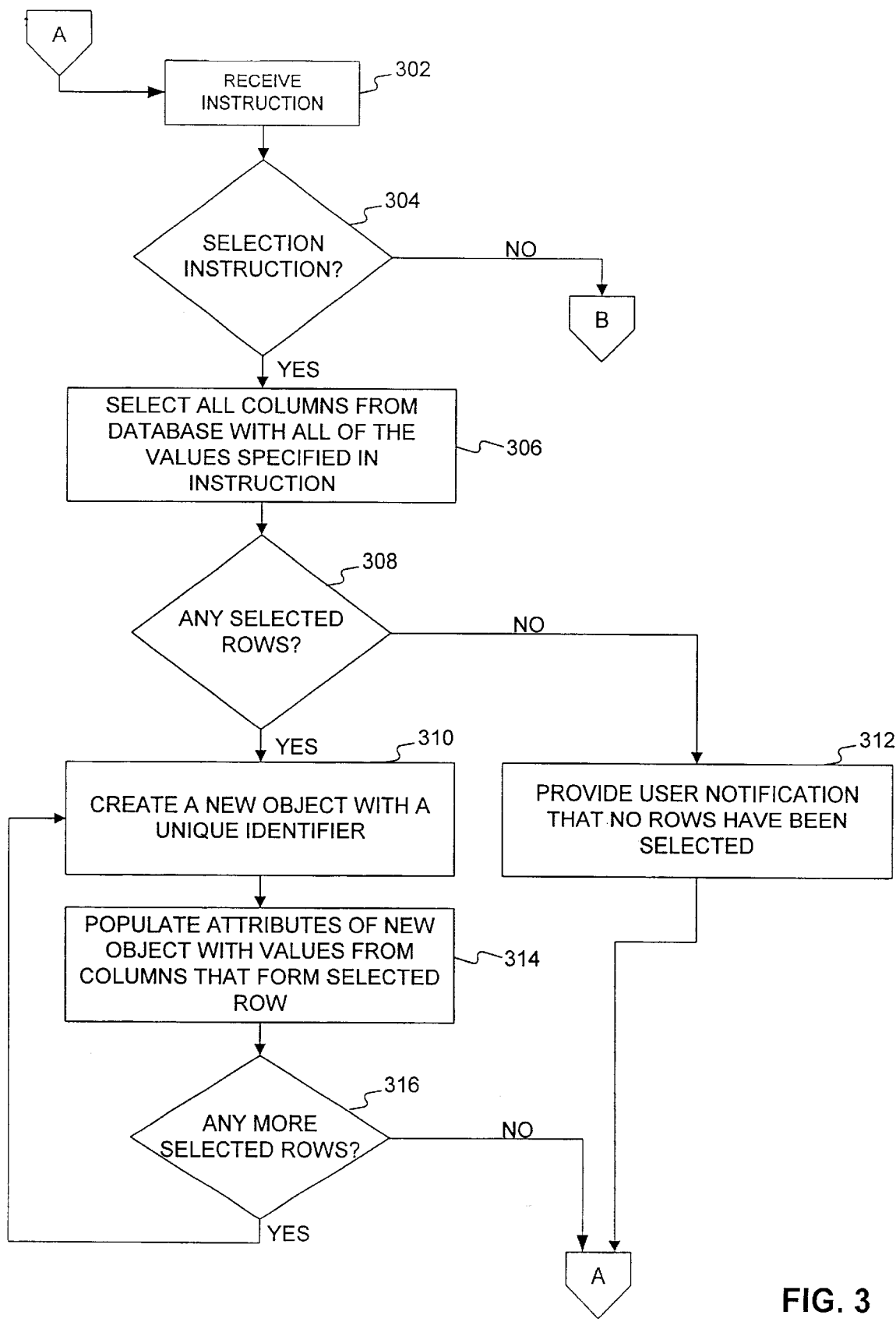
FIG. 3 depicts a flowchart of the steps performed by the object-relation mapping tool in response to a selection instruction in a manner consistent with the present invention.

FIG. 2 depicts an example of a relational database table, NOPK 202, which is part of database 114. NOPK 202 table includes NAME column 204 and AGE column 206. Also shown is a schema 208 corresponding to table NOPK 202. Table NOPK 202 has no primary keys and may have the following entries (rows):

| NAME | AGE |
|---|---|
| George | 12 |
| John | 12 |
| George | 12 |
| James | 13 |

The object-relational mapping tool provides an object-oriented way to access data in the relational database table NOPK 202 by making rows of the table accessible directly as objects. Specifically, the object-relational mapping tool creates one object for each row of table NOPK 202 and assigns a unique identifier to each object. This unique identifier exists for duration of each transaction and is used to distinguish objects from each other, including objects with the same values. Accordingly, there are four objects corresponding to NOPK 202: George, 12; John, 12; George, 12; and James 13. The two objects with the same values: the first George, 12, and the second George, 12 are distinguishable because each is assigned a different object identifier. Although FIG. 2 depicts only one table as part of database 114, one skilled in the art would recognize that database 114 may have more than one table.

One way to make the rows of the relational database table accessible directly as objects, is to use the Java™ Blend™ tool available from Sun Microsystems of Palo Alto, Calif. The Java™ Blend™ Tutorial, Java™ Blend™ Developer Tools Guide, and Java™ Blend™ Application Programming Guide, are incorporated herein in their entirety as part of this Detailed Description. Sun, Sun Microsystems, the Sun logo, Java™, and Java™-based trademarks are trademarks or registered trademarks of Sun Microsystems, Inc. in the United States and other countries.

Another way to make the rows of the relational database table accessible directly as objects is to use the Java™ database connectivity product (JDBC™) available from Sun Microsystems of Palo Alto, Calif. JDBC™ is a Java™ application program interface (API) for executing structured query language (SQL) statements. It consists of a set of classes and interfaces written in the Java™ programming language. It provides a standard API for database developers such that the developers may write database applications using a pure Java™ API. JDBC™ is described in greater detail in Hamilton, Cattell, and Fisher, *JDBC™ Database Access with Java™*, Addison-Wesley (1997), which is incorporated herein by reference.

Maintenance of Tables without Primary Keys

FIGS. 3, 4, 5, and 6 depict a flow chart of the steps performed by the improved object-relational mapping tool 110 when the object-relational mapping tool receives any table maintenance instruction. Upon receiving an instruction (step 302), the object-relational mapping tool determines whether the instruction is a selection instruction (step 304). If the instruction is a selection instruction with a set of values, or in other words an instruction to read from the table, then the object-relational mapping tool identifies all columns from the database table with all of the values specified in the set (step 306). Next, the object-relational mapping tool determines whether any rows were selected in response to the selection instruction (step 308). If not, then the object-relational mapping tool notifies the user that no rows have been selected (step 312). If, however, any row is selected, the object-relational mapping tool creates a new object with a unique object identifier (step 310). Next, the object-relational mapping tool populates attributes of the newly created object with values from columns that form the selected row (step 314). Later, the object-relational mapping tool determines whether any more rows were selected, and if yes, then it repeats steps 310 and 314, until objects corresponding to all of the selected rows have been created (step 316).

Figure 4:
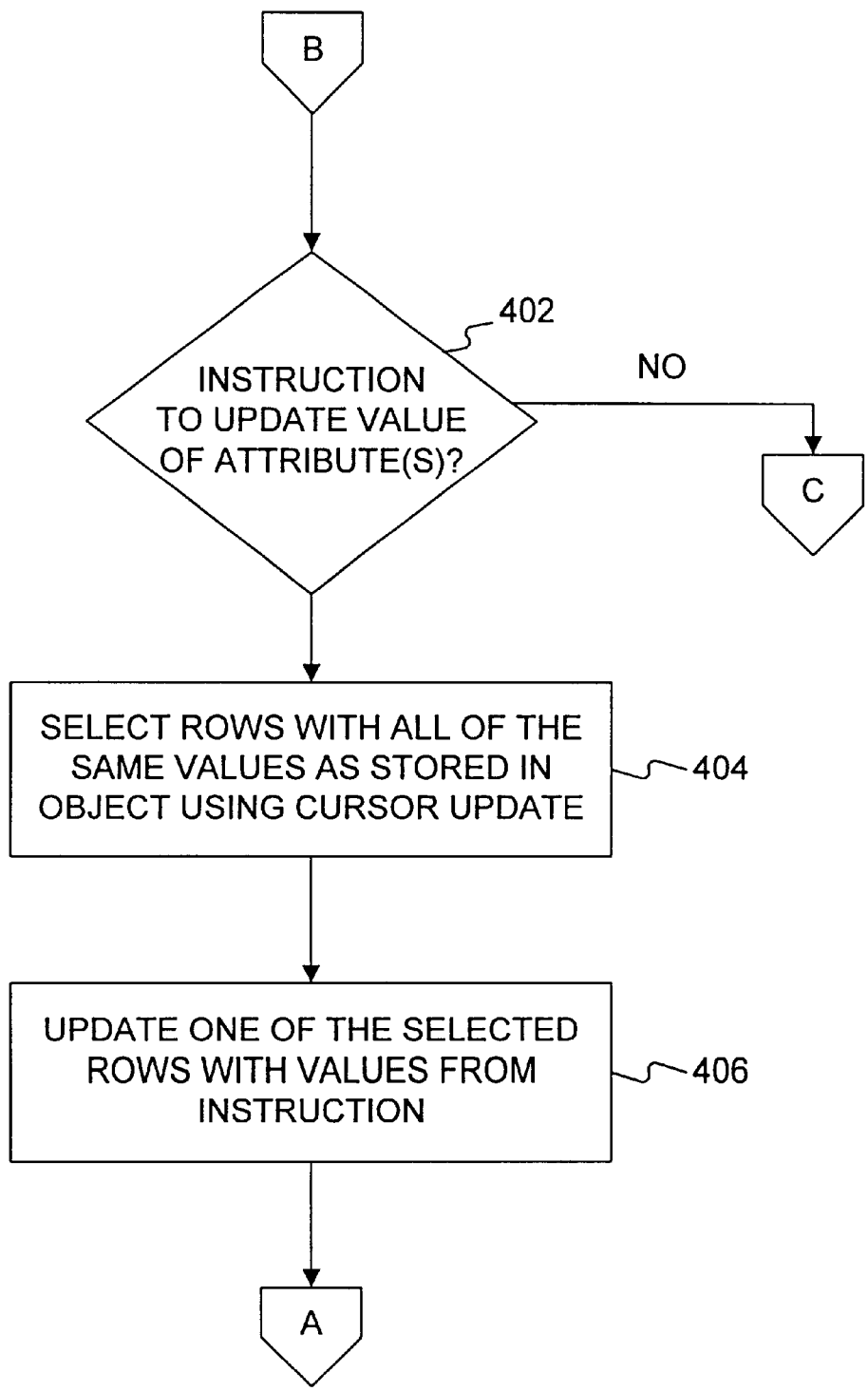
FIG. 4 depicts a flowchart of the steps performed by the object-relation mapping tool in response to an instruction to update an object in a manner consistent with the present invention.

Referring now to FIG. 4, the object-relational mapping tool determines whether the instruction is to update value(s) of attribute(s) of an object (step 402). If the instruction is to update value(s) of attribute(s) then the object-relational mapping tool selects rows with all of the same values as stored in the object using cursor update (step 404). Cursor update is an operation associated with relational database systems that manages the table to identify any rows in the table that have values in columns that match all of the values of the attributes of an object to be updated. Cursor update is described in greater detail in C. J. Date, *An Introduction to Database Systems*, Addison-Wesley (1986), which is incorporated herein by reference. Another reference Ramez Elmasri, Shamkant B. Navathe, *Fundamentals of Database Systems*, Benjamin/Cummings (1989), which describes cursor update is incorporated herein by reference.

Next, the object-relational mapping tool updates one of the selected rows with values from the instruction (step 406). When updating the columns in a row the object-relational mapping tool maintains an image of the object before the update and uses that object image when invoking the cursor update operation to locate the row to be updated. Even though a table may contain more than one row with the same values in the columns and thus more than one row may be selected, the object-relational mapping tool updates only one row.

Figure 5:
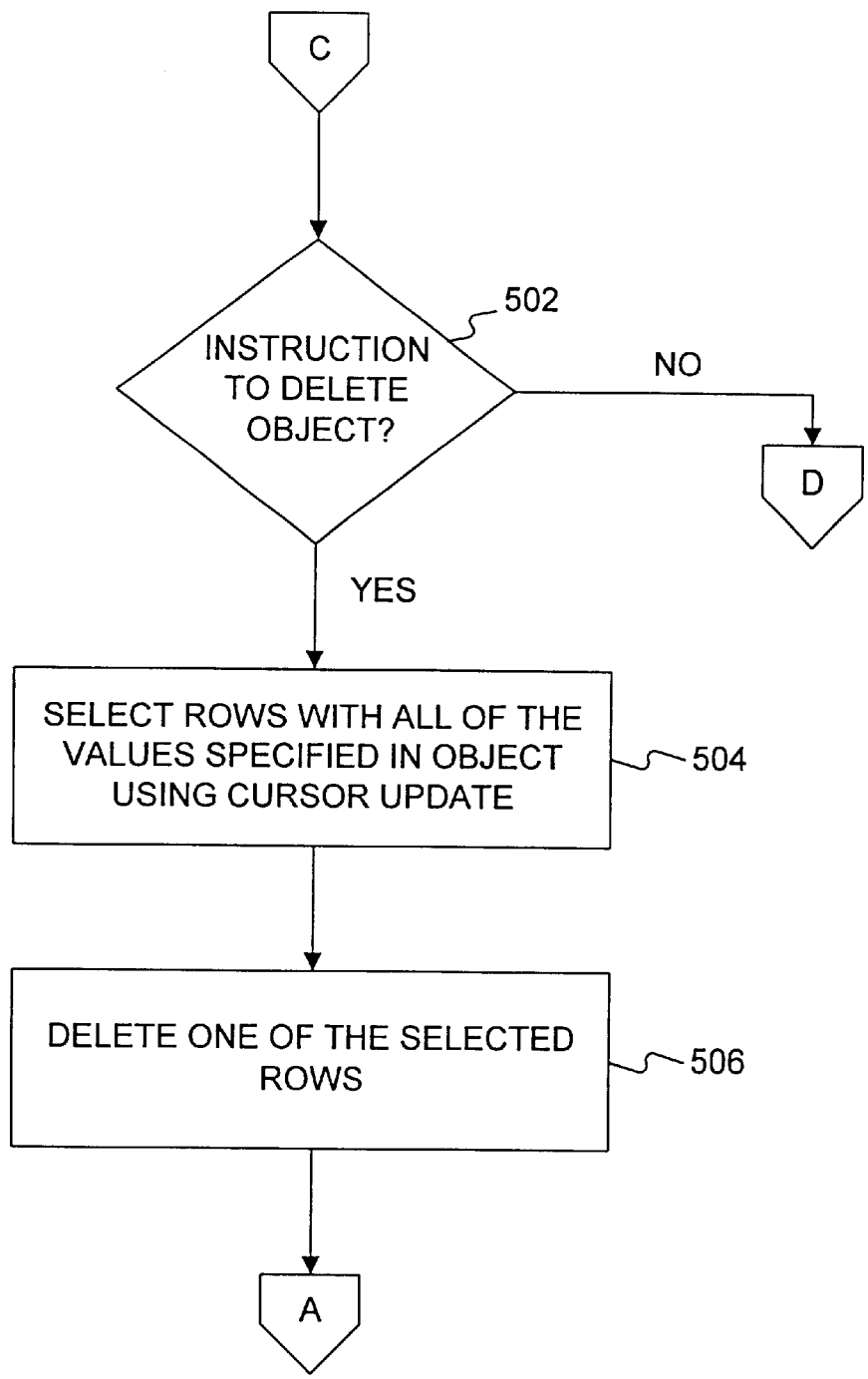
FIG. 5 depicts a flowchart of the steps performed by the object-relation mapping tool in response to an instruction to delete an object in a manner consistent with the present invention.

Referring now to FIG. 5, the object-relational mapping tool next determines whether the instruction is to delete an object (step 502). If the instruction is to delete an object then the object-relational mapping tool selects rows with all of the values specified in the object to be deleted using cursor update (step 504). Subsequently, the object-relational mapping tool deletes one of the selected rows (506). Even though a table may contain more than one row with the same values in the columns and accordingly more than one row may be selected, the object-relational mapping tool deletes only one row. For example, consider table NOPK 202 mentioned earlier with the following rows:

George 12
John 12
George 12
James 13

A selection or read instruction for all people in table NOPK 202 who are age 12 will result in three objects: George, 12; John, 12; and George, 12. If the first object is deleted, then only one object George, 12 will be deleted from the table. If the first object is updated, then only one object George, 12 is updated in the database table NOPK 202.

Figure 6:
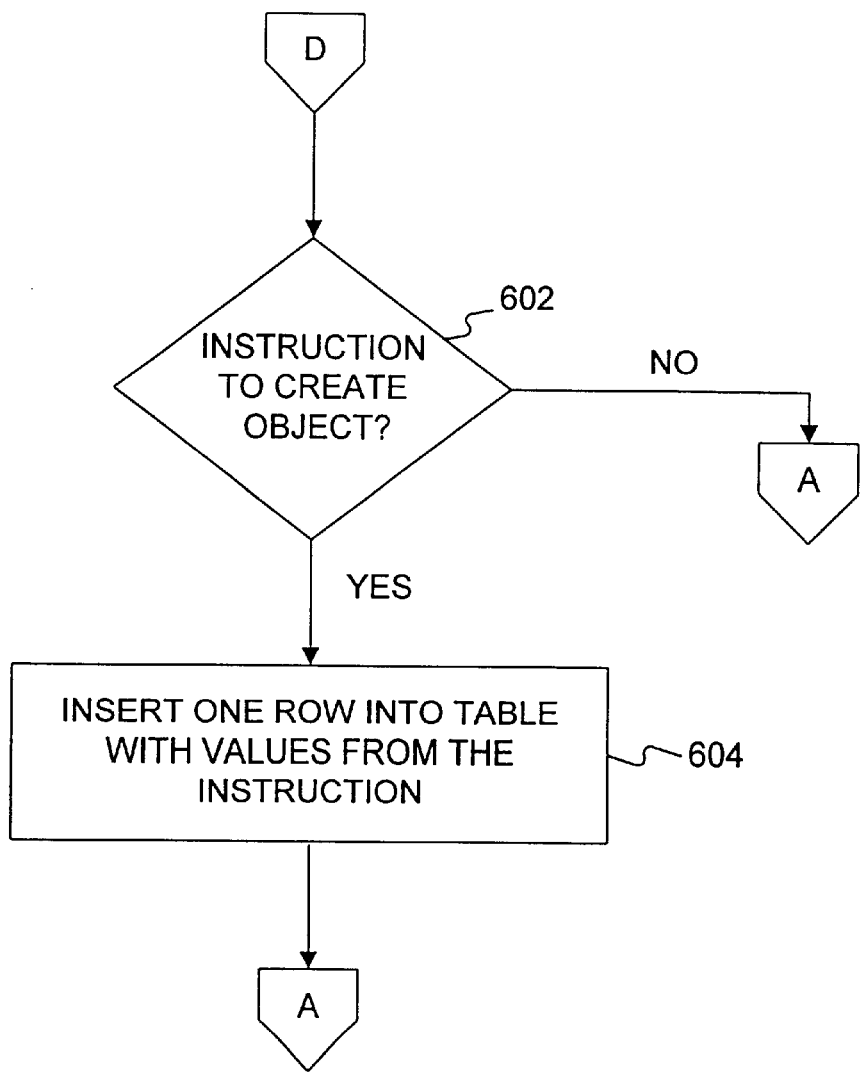
FIG. 6 depicts a flowchart of the steps performed by the object-relation mapping tool in response to an instruction to create an object in a manner consistent with the present invention.

Referring now to FIG. 6, the object-relational mapping tool next determines whether the instruction is to create an object (step 602). If the instruction is to create an object then the object-relational mapping tool inserts one row into the database table with values from the instruction.

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A method in a computer system having a non-primary key table, wherein each row in the table is represented by a corresponding object, comprising:

receiving an instruction selected from a selection instruction, an update instruction, and a delete instruction, wherein the selection instruction includes a set of values, the update instruction is to update values of attributes of an object, and the delete instruction is to delete an object; and upon receipt of a selection instruction,
identifying, in the table, all columns with all of the values specified in the set of values included with the received selection instruction to select a set of rows from the table, and
for each selected row, creating an object with a unique identifier and populating attributes of the object with values from columns that form the selected row, or upon receipt of an update instruction,
selecting in the table, rows with all of the same values as stored in the object using cursor update, and
updating one of the selected rows in the table with values from the update instruction, or upon receipt of a delete instruction,
selecting, from the table, rows with all of the same values as stored in the object using cursor update, deleting one of the selected rows.

2. A computer system having a non-primary key wherein each row in the table is represented by a corresponding object, comprising:

means for receiving an instruction selected from a selection instruction, an update instruction, and a delete instruction, wherein the selection instruction includes a set of values, the update instruction is to update values of attributes of an object, and the delete instruction is to delete an object;

means for identifying, in the table, all columns with all of the values specified in the set of values included with a received selection instruction to select a set of rows from the table, and, for each selected row, for creating an object with a unique identifier and populating attributes of the object with values from columns that form the selected row;

means for selecting in the table, rows with all of the same values as stored in the object using cursor update upon receipt of an update instruction, and for updating one of the selected rows in the table with values from the update instruction; and means for selecting, from the table, rows with all of the same values as stored in the object using cursor update upon receipt of a delete instruction, and for deleting one of the selected rows.

3. A computer-readable medium containing instructions for causing a computer system to perform a method using a non-primary key table, the method comprising:

receiving an instruction selected from a selection instruction, an update instruction, and a delete instruction, wherein the selection instruction includes a set of values, the update instruction is to update values of attributes of an object, and the delete instruction is to delete an object; and upon receipt of a selection instruction,
identifying, in the table, all columns with all of the values specified in the set of values included with the received selection instruction to select a set of rows from the table, and
for each selected row, creating an object with a unique identifier and populating attributes of the object with values from columns that form the selected row, or upon receipt of an update instruction,
selecting in the table, rows with all of the same values as stored in the object using cursor update, and
updating one of the selected rows in the table with values from the update instruction, or upon receipt of a delete instruction,
selecting, from the table, rows with all of the same values as stored in the object using cursor update, deleting one of the selected rows.

4. A method in a computer system having a non-primary key table, comprising the steps of:

receiving a selection instruction with a set of values;

identifying all columns from the table with all of the values specified in the set to select a set of rows from the table; and for each selected row, creating an object with a unique identifier and populating attributes of the object with values from columns that form the selected row, wherein the unique identifier exists for the duration of a transaction.

5. A computer system having a non-primary key table, comprising:

means for receiving a selection instruction with a set of values;

means for identifying all columns from the table with all of the values specified in the set to select a set of rows from the table; and means for creating, for each selected row, an object with a unique identifier and populating attributes of the object with values from columns that form the selected row, wherein the unique identifier exists for the duration of a transaction.

6. A computer-readable medium containing instructions for causing a computer to perform a method using a non-primary key table, the method comprising:

receiving a selection instruction with a set of values;

identifying all columns from the table with all of the values specified in the set to select a set of rows from the table; and for each selected row, creating an object with a unique identifier and populating attributes of the object with values from columns that form the selected row, wherein the unique identifier exists for the duration of a transaction.

* * * * *